(12) United States Patent
Van Eeden et al.

(10) Patent No.: US 9,317,725 B1
(45) Date of Patent: Apr. 19, 2016

(54) RFID PROTOCOL

(71) Applicant: ICOMP TECHNOLOGY(DALIAN) CO., LTD, Dalian, Liaoning (CN)

(72) Inventors: Hendrik Lodewyk Van Eeden, Liaoning (CN); Calvin Zhang, Liaoning (CN); Taylor Tian, Liaoning (CN); Youbon Qiu, Liaoning (CN); Hunter Xu, Liaoning (CN)

(73) Assignee: ICOMP TECHNOLOGY (DALIAN) CO., LTD., Dalian, Liaoning (CN)

( * ) Notice: Subject to any disclaimer, the term of this patent is extended or adjusted under 35 U.S.C. 154(b) by 0 days.

(21) Appl. No.: 14/388,824

(22) PCT Filed: Mar. 21, 2014

(86) PCT No.: PCT/CN2014/073822
§ 371 (c)(1),
(2) Date: Sep. 29, 2014

(87) PCT Pub. No.: WO2015/043141
PCT Pub. Date: Apr. 2, 2015

(30) Foreign Application Priority Data

Sep. 27, 2013 (CN) .......................... 2013 1 0447063

(51) Int. Cl.
*G06K 7/00* (2006.01)
*G06K 7/10* (2006.01)
*G06K 19/07* (2006.01)

(52) U.S. Cl.
CPC ........ *G06K 7/10297* (2013.01); *G06K 7/10227* (2013.01); *G06K 19/0712* (2013.01); *G06K 19/0723* (2013.01)

(58) Field of Classification Search
CPC .......... G06K 7/10297; G06K 19/0712; G06K 19/0723
See application file for complete search history.

(56) References Cited

U.S. PATENT DOCUMENTS

| 8,154,387 | B2 | 4/2012 | Van Eeden et al. | |
|---|---|---|---|---|
| 2004/0140884 | A1 | 7/2004 | Gallagher, III et al. | |
| 2006/0109086 | A1* | 5/2006 | Amtmann | G06K 7/0008 340/10.3 |
| 2006/0119470 | A1* | 6/2006 | Breitfuss | G06K 7/10297 340/10.1 |
| 2006/0125605 | A1* | 6/2006 | Fischer | G06K 7/0008 340/10.41 |
| 2007/0096876 | A1* | 5/2007 | Bridgelall | H04B 7/0802 340/10.1 |
| 2007/0236331 | A1 | 10/2007 | Thompson et al. | |
| 2008/0204194 | A1* | 8/2008 | Haar | G06K 19/0723 340/10.1 |
| 2009/0045921 | A1* | 2/2009 | Nelson | G06K 7/10297 340/10.2 |
| 2009/0045923 | A1 | 2/2009 | Van Eeden | |

FOREIGN PATENT DOCUMENTS

CN 103500348 A 1/2014

* cited by examiner

*Primary Examiner* — Andrew Bee
(74) *Attorney, Agent, or Firm* — Im IP Law PLLC; C. Andrew Im

(57) ABSTRACT

A method of adding TTO functionality to an RTF RFID air protocol, such as ISO/IEC 18000-63 and EPC C1G2 protocol, Chinese GB/T 29768-2013. The starting wait state is changed after power-up of the RTF protocol to a TTO state where the tag automatically transmits an ID or an ID plus additional data at intervals to a reader while still waiting for possible RTF commands. A new command is added that enables the reader to obtain a handle from the tag directly from the TTO state to access the tag in an identical manner to the RTF access. The TTO functionality is as defined by the ISO/IEC 1800-64 protocol or IP-X protocol.

20 Claims, 4 Drawing Sheets

RFID PROTOCOL

RELATED APPLICATIONS

This application is a §371 application from PCT/CN2014/073822 filed Mar. 21, 2014, which claims priority from Chinese Patent Application No. 201310447063.7 filed Sep. 27, 2013, each of which is herein incorporated by reference in its entirety

TECHNICAL FIELD OF THE INVENTION

This invention relates to an improved air protocol for RFID systems.

BACKGROUND OF THE INVENTION

There are radio frequency identification (RFID) systems which include at least one RFID reader, also known as an interrogator, and a plurality of electronic transponders, also known as RFID tags. The RFID tags are typically passive, being energized by a broadcast radio frequency (RF) signal or power-up beam from the interrogator, but can also be active or semi-active, having an additional power source like a battery. The reader communicates with the tags by modulating commands and data onto the power-up beam (the so-called "forward link"), while the tags communicate with the reader by reflecting a varying amount of the energy from the power-up beam back to the reader, also known as "backscatter" (the so-called "return link"). The rules which define the parameters of the communication between the tags and reader are known as the air protocol. The protocol parameters typically include aspects such as encoding schemes, baud rates, command sequences, command formats and responses.

There are a large number of different RFID air protocols in use in the world today. These protocols can be broadly classified according to whether the reader initiates the communication between tag and reader, or whether the tag initiates the communication. If the reader initiates the communication, the protocol is called a "Reader Talks First" or RTF protocol. If the tag initiates the communication, the protocol is called a "Tag Talks First" or TTF protocol. An extreme case of a TTF protocol is the "Tag Talks Only" or TTO protocol, in which the reader never modulates the power-up beam to talk to the tags.

An example of an RTF protocol is the ultra high frequency (UHF) air protocol ISO/IEC 18000-63, one of the best known and most widely used air protocols today. ISO/IEC 18000-64 is an example of a TTO air protocol, while IP-X is an example of a TTF air protocol (which can also operate in a TTO mode). Although the rest of this discussion will use these passive UHF air protocols as examples, the classification into RTF, TTF or TTO is not limited to UHF air protocols, but is equally applicable at other carrier frequencies, such as at low frequency (LF) or high frequency (HF). It is also not only applicable to passive RFID, but also to semi-active, battery assisted or active tag systems.

RTF protocols such as ISO/IEC 18000-63 typically have complex algorithms for managing tag populations. These include complex schemes for selecting subsets of tag populations based on tag memory content or other aspects, and then inventorying and finally singulating tags. Once a tag has been singulated, i.e. a one-on-one communication channel between a specific tag and the reader has been opened, the reader can access the rest of tag memory, e.g. writing data to tag memory or reading data from tag memory. This access could possibly be preceded by security measures, such as exchange of access passwords or setting up a secured encrypted channel.

The complex but flexible RTF approach is theoretically capable of managing tag populations of various sizes efficiently. Large amounts of data can be handled, securely if needed. It has, however, a number of drawbacks:

The reader-driven RTF anti-collision process creates a large amount of interference. Reader transmissions are maybe 10 orders of magnitude more powerful than tag backscatter (maybe +36 dBm vs. maybe −80 dBm) and can interfere with tag backscatter over long ranges. As a result, readers cannot share spectrum channels or even operate in adjacent spectrum channels. When there are more readers to be deployed in proximity than the available spectrum channels, readers have to be time-multiplexed. This puts an upper limit on the total throughput that can be achieved at a single installation.

The RTF protocol has difficulty handling fast moving tagged objects. Movement speed is limited by the rate at which the reader initiates new inventory rounds ("polling rate"). In addition, spectrum regulations and available channel bandwidth limit the baud rate that can be used for the forward link, placing a further limit on the speed that tagged objects can move past an RTF reader.

TTO protocols do not suffer from any of the above drawbacks. There is no reader modulation and therefore very little reader interference. Multiple readers can be operated simultaneously in proximity in the same spectrum channel. There is no polling since tags automatically transmit their ID and data as they enter the reader beam. Since there is no forward link, there is also no spectrum regulation induced limit on the baud rate. TTO protocols can therefore handle fast moving tagged objects much better than RTF protocols.

The claim invention proceeds upon the desirability of removing or at least improving the above mentioned problems relating to RTF protocols by proposing a method by which a TTO capability can be added with very little effort to an existing RTF protocol.

SUMMARY OF THE INVENTION

An example of a passive RTF protocol state diagram is given in FIG. 1. When the tag receives power from the reader beam, it powers-up and enters a wait state (1), where it waits for a reader command. The reader typically starts a singulation process or anti-collision sequence (2) at regular intervals by first issuing a command to select a subset of tags, and then start an inventory round by specifying various parameters relating to the anti-collision process. The reader will then steer the anti-collision process by means of a series of commands until it receives a clear reply from a single tag. At this point, the reader can acknowledge the tag and the tag can respond with a handle and can move to an acknowledged state (3). A one-one-one communication channel has now been established between the reader and a specific tag. Using the handle, the reader can now access the tag and write data to or read data from the tag as might be needed (Access state (5)). If there is a need for secure identification or for a secure encrypted channel, the reader can first exchange passwords or other security parameters (state (4)).

FIG. 2 shows how the above RTF state diagram can be modified in accordance with an exemplary embodiment of the claimed invention, in order to add a TTO capability to the RTF protocol. In the improved state diagram, when the tag receives power from the reader beam, it powers-up and enters a TTO state (1). Instead of just waiting for a reader command, the tag transmits its ID or its ID plus additional data as configured at a low duty cycle (typically less than 4%) at random or pseudo-random intervals. The duty cycle should preferably be low enough so that the TTO transmissions do not interfere markedly with the RTF process that might be ongoing at the time the tag wakes up.

At this point, the reader will now have obtained an ID and possibly additional data from the tag without issuing any commands. Preferably, this can happen at high speed and without any interference. The reader may still proceed with a regular RTF anti-collision sequence (2) from this state if it required. However, upon receiving a TTO transmission, the reader may also immediately issue a new, special command to obtain a handle directly from the tag, using the just-received ID or a part of it as a means for addressing the tag. Using this handle, the reader can then proceed to access data on the tag openly (5) or securely via state (4), exactly as before, the only difference being that the handle was not obtained as part of an RTF anti-collision sequence, but rather directly from the TTO anti-collision sequence.

It can be seen that, in accordance with an exemplary embodiment of the claimed invention, all the existing functionality of the RTF protocol is maintained, while adding a TTO functionality that improves the handling of fast-moving tagged objects and that reduces interference, allowing for multiple readers to be operated simultaneously in proximity.

It should be noted that for an RTF protocol, the communication parameters for the return link, such as baud rate and encoding scheme, are usually set up in the command that initiates an inventory round. Since there is no such command in the case of a TTO anti-collision sequence, the communication parameters must be set up beforehand. In accordance with an exemplary embodiment of the claimed invention, this can be done by configuring the tag chip during manufacturing, wafer probe testing or tag initialisation with predefined values, e.g. as specified in ISO/IEC 18000-64. The configuration or re-configuration can also be done by means of a custom command that can be issued from the Access state.

U.S. Pat. No. 8,154,387 describes a TTO tag which is able to detect an RTF protocol communication signal, and then suspends its own TTO response when such an RTF communication signal is detected. This is done in order to avoid interference with RTF systems. However, the tag described in U.S. Pat. No. 8,154,387 is not operable in an RTF mode as required in the claimed invention.

U.S. Application No. 20090045923 describes a tag that is operable in both an RTF and a TTO protocol mode. However, unlike the present invention, neither the RTF nor the TTO protocol is modified in any way. The tag can merely switch between the two protocols, depending on which kind of reader is present.

BRIEF DESCRIPTION OF THE DRAWINGS

The following detailed description, given by way of example, and not intended to limit the claimed invention solely thereto, will best be understood in conjunction with the accompanying drawings in which:

DETAILED DESCRIPTION OF THE EMBODIMENTS

Figure 1:
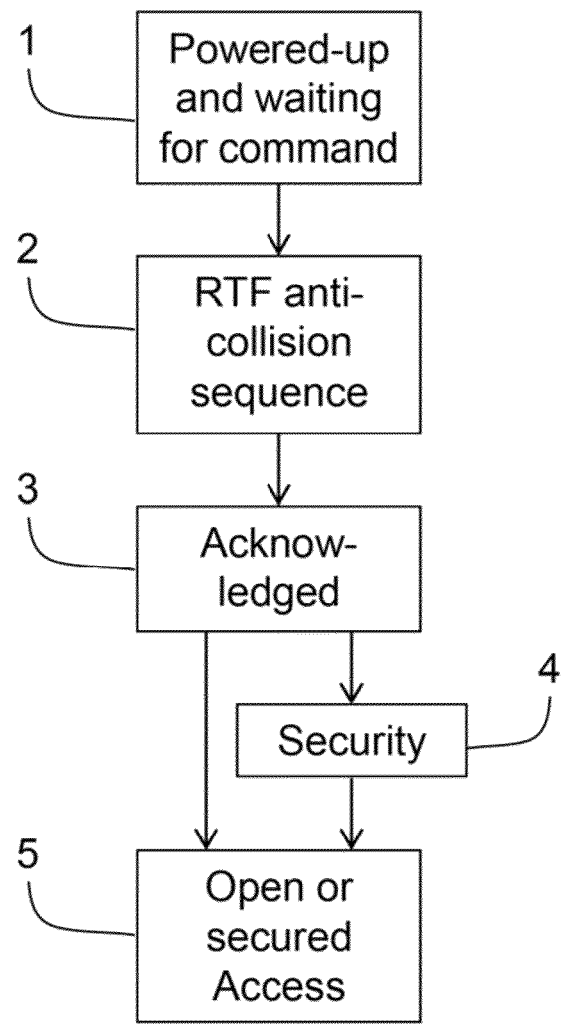
FIG. 1 is a typical state diagram for an RTF protocol.
Figure 2:
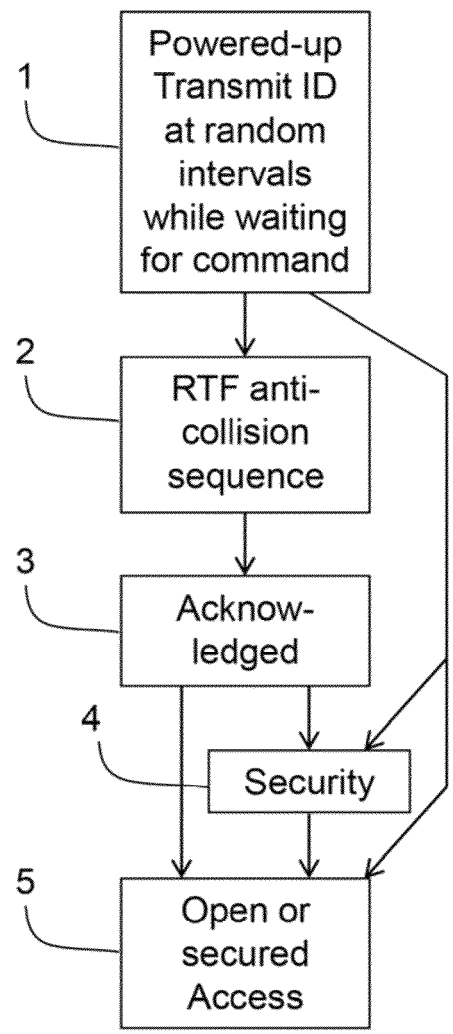
FIG. 2 is a modified state diagram in accordance with an exemplary embodiment of the claimed invention.

In accordance with an exemplary embodiment of the claimed invention, the ISO/IEC 18000-63 protocol is modified and improved in order to add a TTO capability to this protocol. The unmodified protocol has the drawbacks typical of an RTF protocol, namely:

Reader pollution: Excessive reader modulation during the anti-collision phase interferes with other readers, tags and systems.

Low speed: The need to poll, coupled with spectrum limited baud rates on the forward link, makes the protocol inherently slow.

Lack of scalability: Readers have to operate in their own spectrum channels and have to be time-multiplexed where spectrum is limited. Only a small number of readers can be operated simultaneously in proximity.

Tag sensitivity is affected negatively by the modulation of the forward link

The protocol can be enhanced through the addition of TTO capabilities. This will have the following benefits:

Ability to deploy and run larger numbers of readers simultaneously in proximity.

Reduced reader pollution. Less interference with neighbouring RFID systems or other electronic systems.

Higher speed: No polling or return link baud rate limitations imposed by spectrum regulations.

Higher sensitivity in TTO mode, since the forward link modulation will be eliminated.

Please refer to the published international standard ISO/IEC 18000-63, which is incorporated herein by reference in its entirety, for the following discussion.

ISO/IEC 18000-63 tag memory is divided into four blocks: Reserved, UII, TID and USER. The TID block contains, amongst other things, a unique chip serial number, which can be transmitted in a TTO mode in order to uniquely identify the tag.

The TTO enhancement can be achieved by adding two new commands to the protocol and modifying the state diagram. The two new commands are the following:

The Req_TTO_RN command is equivalent to the normal Req_RN command. It changes the tag status directly from the "Ready" state to the "Open" or "Secured" state if the command is received within a defined time period after a TTO transmission, in the same way as would happen after an RTF anti-collision sequence followed by a Reply and Acknowledgement. From the "Open" or "Secured" states all the commands can be executed that could normally be executed from those states after an RTF anti-collision sequence. The Req_TTO_RN command uses the received TID or a part thereof as a means to uniquely identify the tag at which the command is targeted. When the tag receives the Req_TTO_RN command, it responds with an RN16 to be used as a handle during subsequent commands, in the same way as for a Req_RN command.

The Config_TTO command is used to write TTO configuration data to a dedicated custom area of memory. The command defines the data (if any) to be transmitted together with the TID automatically during the TTO anti-collision phase, as well as the duty cycle to be used during the TTO anti-collision phase. The Config_TTO command is in reality just a special version of a Write command, and the response is the same as for a Write command, i.e. either its handle indicating success, or an error code.

Figure 3:
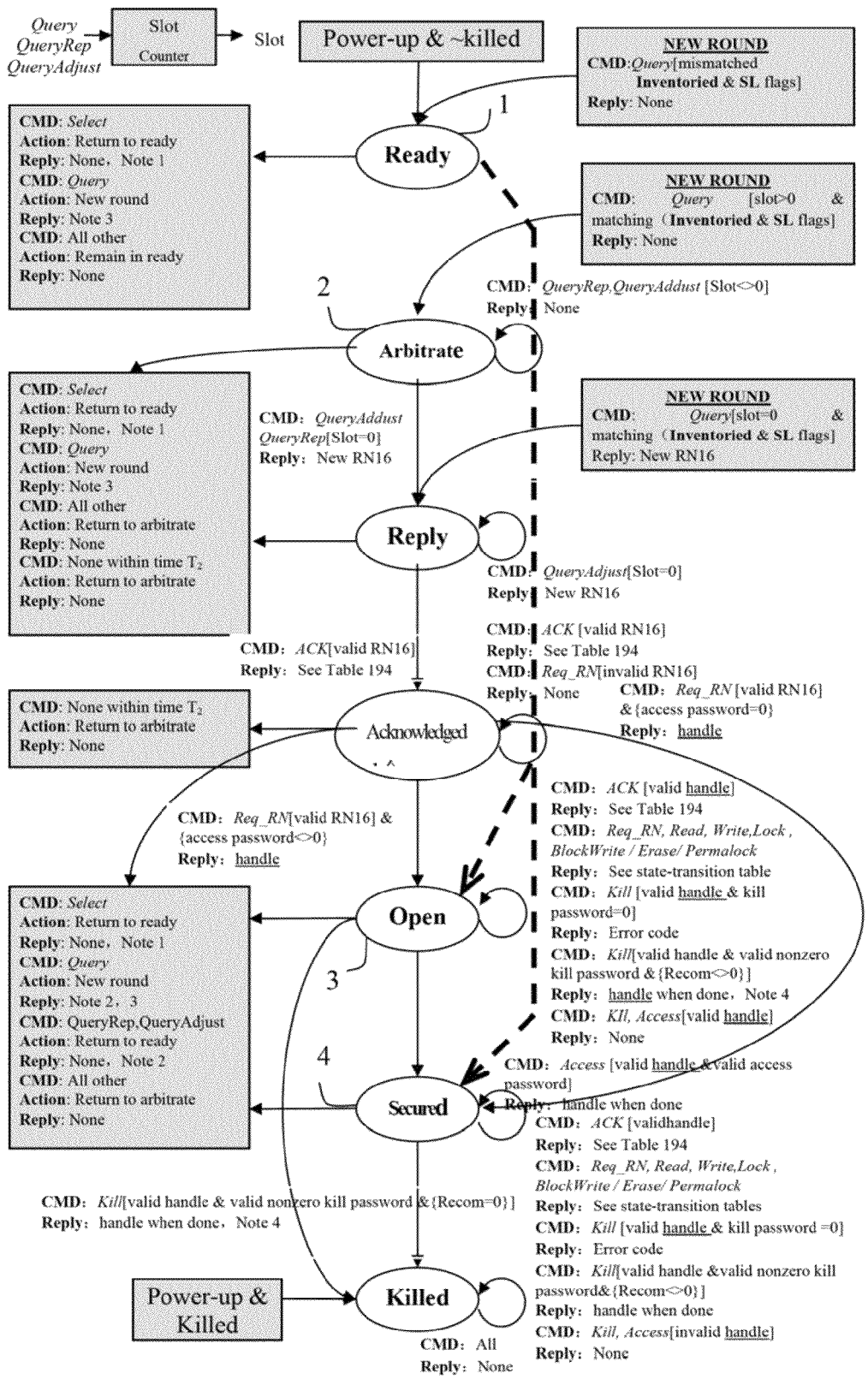
FIG. 3 is a modified state diagram for the ISO/IEC 18000-63 protocol showing how TTO functionality can be added in accordance with an exemplary embodiment of the claimed invention.

In accordance with an exemplary embodiment of the claimed invention, the state diagram is modified as shown in FIG. 3. Only the "Ready" state (1) is modified. Instead of just waiting for a Select or Query command, the tag transmits its TID or TID plus additional data (e.g. from the UII bank or USER bank) at random intervals while waiting for a command.

From the "Ready" state the following may happen:
Receipt of a Select command is handled as before and the tag remains in the Ready state.
Receipt of a Query command causes a state transition to the "Arbitrate" state (2).
Receipt of a Req_TTO_RN command within a defined time after a TTO transmission causes a transition to either the "Open" state (3) or the "Secured" state (4), depending on the value of the access password stored in Reserved memory. From there the tag behaviour is identical to the normal behaviour, i.e. all the Access and Kill commands are available.

Read-only tags may implement only the "Ready" state. Read/Write tags may implement either the RTF anti-collision mechanism or the TTO anti-collision mechanism, while retaining all the access features normally contained in the standard.

Figure 4:
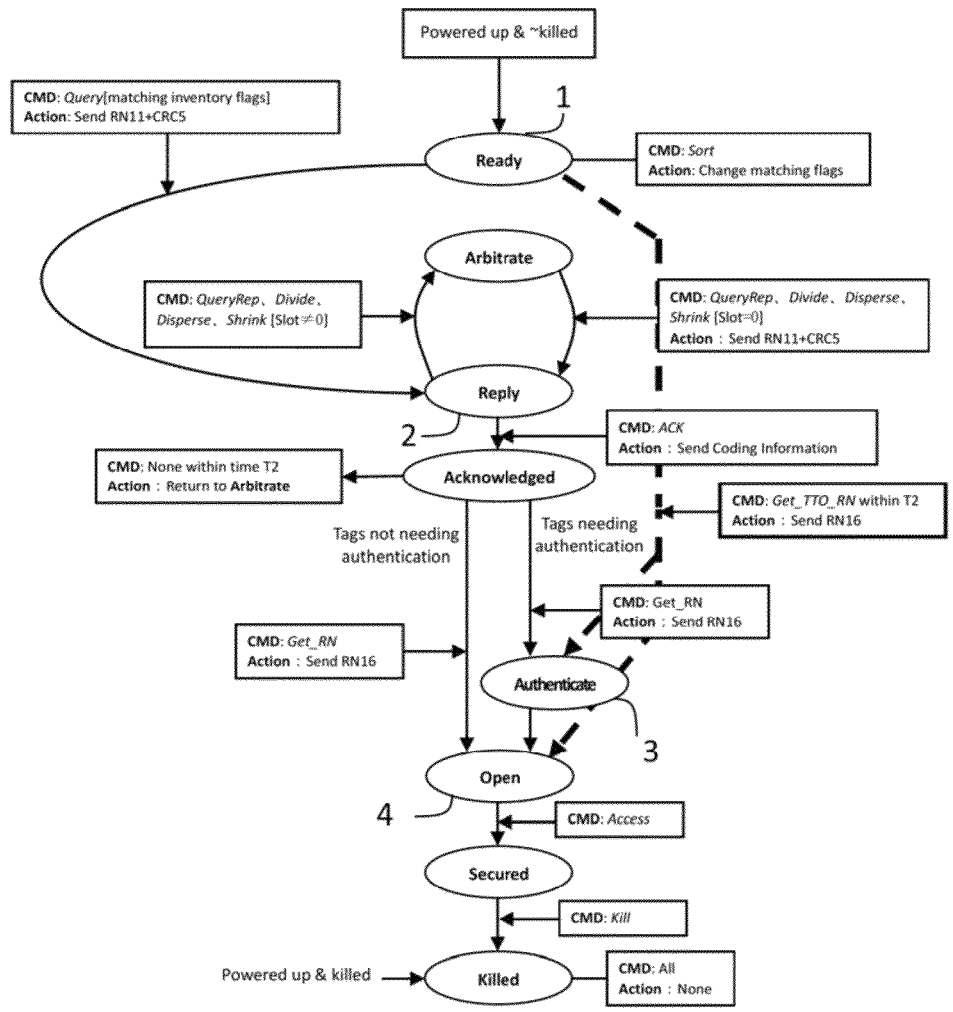
FIG. 4 is a modified state diagram for the Chinese standard protocol showing how a TTO functionality can be added in accordance with an exemplary embodiment of the claimed invention.

In accordance with an exemplary embodiment of the claimed invention, FIG. 4 shows a modified state diagram for Chinese GB/T 29768-2013 "information technology 800-900 MHz RFID air interface protocol". The protocol is an RTF protocol, similar in many respects to ISO/IEC 18000-63. As such it would have all the same drawbacks as mentioned, while it could benefit in the same ways by the addition of TTO functionality.

Please refer to Chinese GB/T 29768-2013 "information technology 800-900 MHz RFID air interface protocol" standard, which is incorporated herein by reference in its entirety, for the following discussion.

This standard also divides tag memory into four blocks, one of which is a TID block with a unique serial number which could be used for unique tag identification in the TTO mode.

The TTO enhancement can again be achieved by adding two new commands to the protocol and modifying the state diagram. The two new commands are the following:

The Get_TTO_RN command is equivalent to the normal Get_RN command. It changes the tag status directly from the "Preparation" state to the "Identification" or "Unlocked" state if the command is received within a defined time period after a TTO transmission, in the same way as would happen after an RTF anti-collision sequence followed by a Coding Response and Confirmation. From the "Identification" or "Unlocked" states all the commands can be executed that could normally be executed from those states after an RTF anti-collision sequence. The Get_TTO_RN command uses the received TID or a part thereof as a means to uniquely identify the tag at which the command is targeted. When the tag receives the Get_TTO_RN command, it responds with a handle and an RN16 to be used during subsequent commands, in the same way as following an RTF anti-collision sequence.

The Config_TTO command is used to write TTO configuration data to a dedicated custom area of memory. The command defines the data to be transmitted with the TID automatically during the TTO anti-collision phase, as well as the duty cycle to be used during the TTO anti-collision phase. The Config_TTO command is in reality just a special version of a Write command, and the response is the same as for a Write command, i.e. either its handle indicating success, or an error code.

In accordance with an exemplary embodiment of the claimed invention, the state diagram is modified as shown in FIG. 4. Only the "Preparation" state (1) is modified. Instead of just waiting for a Select or Query command, the tag transmits its TID or TID plus additional data (e.g. from the Coding region or the User area) at random intervals while waiting for a command.

From the "Preparation" state the following may happen:
Receipt of a Sort command is handled as before and the tag remains in the Preparation state.
Receipt of a Query command causes a state transition to the "Response" state (2).
Receipt of a Get_TTO_RN command within a defined time after a TTO transmission causes a transition to either the "Identification" state (3) or the "Unlocked" state (4), depending on whether the tag needs secure identification or not. From there the tag behaviour is identical to the normal behaviour, i.e. all the Access and Kill commands are available.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

The invention claimed is:

1. A method of adding Tags Talk Only (TTO) functionality to a Reader Talks First (RTF) radio frequency identification (RFID) air protocol, comprising the steps of:
changing a starting wait state after power-up of a RTF protocol to a TTO state where a tag automatically transmits an ID or an ID plus additional data at intervals to a reader while still waiting for RTF commands; and
adding a new command to enable the reader to obtain a handle from the tag directly from the TTO state to access the tag in a manner substantially identical to an RTF access.

2. The method of claim 1, wherein the RTF protocol is an ISO/IEC 18000-63 protocol.

3. The method of claim 1, wherein the RTF protocol is an EPC C1G2 protocol.

4. The method of claim 1, wherein the RTF protocol is a Chinese GB/T 29768-2013, an information technology 800-900 MHz RFID air interface protocol standard.

5. The method of claim 1, wherein the TTO functionality is defined by an ISO/IEC 1800-64 protocol.

6. The method of claim 1, wherein the TTO functionality is defined by an IP-X protocol.

7. The method of claim 1, wherein the tag's response to the new command comprises a handle.

8. The method of claim 1, wherein the tag's response to the new command comprises a random number for use during subsequent access commands.

9. The method of claim 1, wherein the tag's response to the new command comprises a handle and a random number for use during subsequent access commands.

10. The method of claim 1, further comprising the step of transmitting the ID or ID and data at random or pseudo-random intervals.

11. The method of claim 10, wherein an average interval between transmissions varies, either increasing or decreasing with time.

12. The method of claim 1, further comprising the step of transmitting the ID or ID and data at a low duty cycle, typically less than 4%.

13. The method of claim 1, wherein an average interval between transmissions is fixed.

14. The method of claim 1, wherein an average interval between transmissions varies, either increasing or decreasing with time.

15. The method of claim 1, further comprising the step of pre-configuring TTO communication parameters during manufacturing or testing of a chip.

16. The method of claim 15, further comprising the step of issuing TTO configuration command after an RTF anti-collision sequence using RTF communication parameters.

17. The method of claim 15, further comprising the step of issuing the TTO configuration command from an open or a secured access state.

18. The method of claim 15, further comprising the step of issuing the TTO configuration command after a TTO anti-collision sequence using preconfigured or previously configured TTO communication parameters.

19. The method of claim 1, further comprising the step of configuring or reconfiguring TTO communication parameters by a custom TTO command.

20. The method of claim 19, further comprising the step of issuing the TTO configuration command from an open or a secured access state.

\* \* \* \* \*